United States Patent
Tobari et al.

(10) Patent No.: US 8,106,619 B2
(45) Date of Patent: Jan. 31, 2012

(54) POSITION SENSORLESS CONTROLLER FOR PERMANENT MAGNET MOTOR

(75) Inventors: Kazuaki Tobari, Hitachiota (JP); Shigehisa Aoyagi, Hitachi (JP)

(73) Assignees: Hitachi Industrial Equipment Systems Co. Ltd., Tokyo (JP); Hitachi Car Engineering Co., Ltd., Ibaraki (JP)

( * ) Notice: Subject to any disclaimer, the term of this patent is extended or adjusted under 35 U.S.C. 154(b) by 550 days.

(21) Appl. No.: 12/330,629

(22) Filed: Dec. 9, 2008

(65) Prior Publication Data
US 2009/0146592 A1    Jun. 11, 2009

(30) Foreign Application Priority Data
Dec. 10, 2007  (JP) .................................. 2007-317827

(51) Int. Cl.
*H02P 23/00* (2006.01)
(52) U.S. Cl. .............. 318/807; 318/400.01; 318/400.02; 318/700; 318/727; 318/767
(58) Field of Classification Search ............. 318/400.01, 318/400.02, 700, 727, 767, 807
See application file for complete search history.

(56) References Cited

U.S. PATENT DOCUMENTS

| | | | | |
|---|---|---|---|---|
| 5,811,956 | A | * | 9/1998 | Yamamoto ..................... 318/801 |
| 6,462,492 | B1 | * | 10/2002 | Sakamoto et al. ........ 318/400.32 |
| 7,719,226 | B2 | * | 5/2010 | Tobari et al. ..................... 318/807 |
| 7,821,223 | B2 | * | 10/2010 | Tobari et al. ..................... 318/807 |
| 2001/0026140 | A1 | * | 10/2001 | Ishida ........................... 318/727 |
| 2003/0020431 | A1 | * | 1/2003 | Kiuchi et al. .................. 318/779 |
| 2005/0072139 | A1 | * | 4/2005 | Kato .............................. 60/285 |

FOREIGN PATENT DOCUMENTS
JP    2001-251889    9/2001

OTHER PUBLICATIONS
Machine translation of JP2001-251889.*

* cited by examiner

*Primary Examiner* — Walter Benson
*Assistant Examiner* — Kawing Chan
(74) *Attorney, Agent, or Firm* — Antonelli, Terry, Stout & Kraus, LLP.

(57) ABSTRACT

In a calculation for estimating axis error in a permanent magnet motor, a d-axis commanded voltage value is added to the product of three signals, which are a q-axis detected current value or commanded current value, an inductance value, and an estimated speed value, and then the resulting value is divided by the product of a commanded speed value $\omega_r^*$ and induced voltage constant $Ke^*$ or an arctangent calculation is performed in the same way, instead of using a resistance setting.

2 Claims, 7 Drawing Sheets

POSITION SENSORLESS CONTROLLER FOR PERMANENT MAGNET MOTOR

CLAIM OF PRIORITY

The present application claims priority from Japanese patent application serial No. 2007-317827, filed on Dec. 10, 2007, the content of which is hereby incorporated by reference into this application.

FIELD OF THE INVENTION

The present invention relates to a control technology, in a position sensorless control system for a permanent magnet motor, for suppressing a step-out phenomenon in a low-speed rotation range, which is caused by the ambient temperature around a motor, the state of a motor load, and a change in resistance components due to, for example, wires prolonged or shortened between the motor and an electric power converter (inverter) so as to achieve vector control with lowered sensitivity to the resistance components.

BACKGROUND OF THE INVENTION

A known position sensorless vector control method is disclosed in Patent Document 1, in which error between an estimated phase value θc* relative to a control axis and a phase value θ of a permanent magnet motor is estimated from a calculation (this error will be referred to below as the axial error Δθ).

In the disclosed method, commanded voltage values (Vdc*, Vqc*), which are outputs in vector control, detected current values (Idc, Iqc), and a commanded speed value (ω₁c) are used to estimate the axis error from a calculation in equation (1).

[Equation 1]

$$\Delta\theta c = \tan^{-1}\left[\frac{Vdc^* - R^* \cdot Idc + \omega_1 c \cdot Lq^* \cdot Iqc}{Vqc^* - R^* \cdot Iqc - \omega_1 c \cdot Lq^* \cdot Idc}\right] \quad (1)$$

Where
Vdc*: d-axis commanded voltage value
Vqc*: q-axis commanded voltage value
Idc: d-axis detected current value
Iqc: q-axis detected current value
R: Value obtained by the addition of the winding resistance of a motor to the wire resistances of a motor and electric power converter
Ld: d-axis inductance value
Lq: q-axis inductance value
Ke: Induced voltage constant
*: Setting To generate the estimated phase value θc*, the estimated speed value ω₁c is controlled so that the estimated axis error Δθc becomes 0 and integration is performed.

Patent Document 1: Japanese Patent Laid-open No. 2001-251889

SUMMARY OF THE INVENTION

In vector control calculation and axis error estimation calculation, a resistance value R needs to be set, which is obtained by adding the winding resistance of the motor to the wire resistances of the electric power converter (inverter) and motor.

If there is an error (R−R*) in a setting R* of the resistance value R, when an impact load disturbance or the like occurs in a low-speed rotation range, a difference is caused between an actual axial error Δθ and an estimated axial error Δθc, and thereby optimum phase control cannot be carried out. When this happens, the motor may enter a step-out state, disabling its operation.

The present invention is characterized in that, in estimation calculation of axis error, the d-axis commanded voltage value Vdc** is added to the product of three signals, which are the q-axis detected current value Iqc or commanded current value Iq*, the inductance value Lq*, and the estimated speed value ω₁c, and then the resulting value is divided by the product of the commanded speed value ω_r* and induced voltage constant Ke*, instead of using the setting R* of the resistance.

The present invention can provide a position sensorless controller for a permanent magnet motor that can perform a stable operation without causing a step-out phenomenon even when there is a setting error in a motor constant.

DESCRIPTION OF THE PREFERRED EMBODIMENTS

Embodiment of the present invention will be described in detail with reference to the drawings.

First Embodiment

Figure 1:
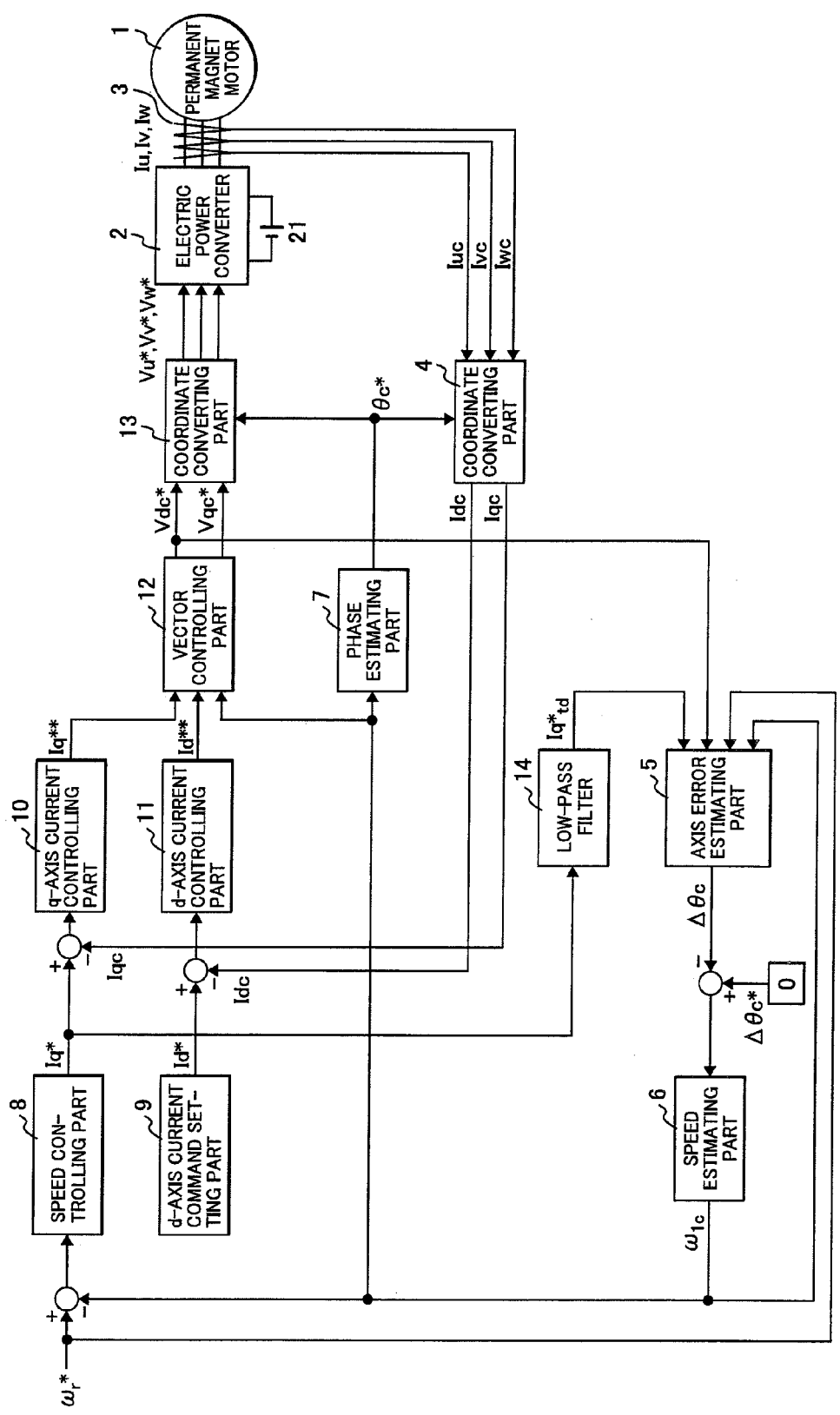
FIG. 1 is a block diagram showing the structure of a position sensorless controller for a permanent magnet motor in an embodiment of the present invention.

FIG. 1 is a block diagram showing an example of the structure of a position sensorless controller for a permanent magnet motor in a first embodiment of the present invention.

The permanent magnet motor 1 outputs a motor torque in which a torque component due to the magnetic flux of the permanent magnet and another torque component due to the inductance of the armature winding are combined.

The electric converter 2 outputs voltages proportional to commanded voltage values Vu*, Vv*, and Vw*, which represent three-phase AC voltages, to change the output voltages and rotational speed of the permanent magnet motor 1.

The DC power supply 21 supplies a DC voltage to the electric power converter 2.

The current detector 3 detects three-phase AC currents Iu, Iv, and Iw of the permanent magnet motor 1.

The coordinate converting part 4 outputs the d-axis detected current value Idc and q-axis detected current value Iqc according to detected values Iuc and Ivc, and Iwc for the three-phase AC currents Iu, Iv, and Iw and the estimated phase value θc*.

The axis error estimating part 5 estimates axis error, which is a difference between the estimated phase value θc* and the phase value θ of the motor, by a calculation according to the commanded voltage values Vdc*, the estimated speed value $\omega_1 c$, a commanded speed value $\omega_r^*$, low-pass filter output values Iq*$_{td}$ obtained from first commanded current values Iq*, and motor constants (Lq and Ke), and then outputs the estimated value Δθc.

The speed estimating part 6 outputs the estimated speed value $\omega_1 c$ from a difference between the commanded value Δθc*, which is 0, for the axis error and the estimated value Δθc for the axis error.

The phase estimating part 7 integrates the estimated speed value $\omega_1 c$ and outputs the estimated phase value θc* to the coordinate converting part 4 and another coordinate converting part 13.

The speed controlling part 8 outputs the commanded current value Iq* for the q-axis according to a difference between the commanded speed value $\omega_r^*$ and the estimated speed value $\omega_1 c$.

The d-axis current command setting part 9 outputs the first d-axis commanded current value Id*, which is 0 in the low-speed rotation range.

The q-axis current controlling part 10 outputs a second q-axis commanded current value Iq** according to the first q-axis commanded current value Iq* and the detected current value Iqc.

The d-axis current controlling part 11 outputs a second d-axis commanded current value Id** according to the first d-axis commanded current value Id* and the detected current value Idc.

The vector controlling part 12 outputs the d-axis commanded voltage value Vdc* and q-axis commanded voltage value Vqc* according to the electrical constants (R, Ld, Lq, and Ke) of the permanent magnet motor 1, the second commanded current values Id and Iq, and the estimated speed value $\omega_1 c$.

The coordinate converting part 13 outputs the commanded voltage values Vu*, Vv*, and Vw*, which represent three-phase AC voltages, according to the commanded voltage values Vdc* and Vqc* and the estimated phase value θc*.

The low-pass filter 14 receives the q-axis commanded value Iq* and outputs the command current value Iq*$_{td}$ used by the axis error estimating part 5.

First, basic methods of controlling voltages and phases will be described.

In a basic operation in voltage control, the q-axis current controlling part 10 uses the first commanded value Id* given from upstream and the detected current value Idc to calculate the second command current value Id, which is an intermediate value used in vector control. Similarly, the d-axis current controlling part 11** uses the first commanded value Iq* and the detected current value Iqc to calculate the second command current value Iq**.

The vector controlling part 12 uses the second commanded values Id and Iq, the estimated speed value $\omega_1 c$, and settings of the motor constants to calculate the command voltage values Vdc* and Vqc* shown in equation (2) so as to control the three-phase commanded voltage values Vu*, Vv*, and Vw* of the inverter.

[Equation 2]

$$\begin{bmatrix} Vdc^* \\ Vqc^* \end{bmatrix} = \begin{bmatrix} R^* & -\omega_1 \cdot Lq^* \\ \omega_1 \cdot Ld^* & R^* \end{bmatrix} \cdot \begin{bmatrix} Id^{} \\ Iq^{} \end{bmatrix} + \begin{bmatrix} 0 \\ \omega_1 \cdot Ke^* \end{bmatrix} \quad (2)$$

In a basic operation in phase control, the axis error estimating part 5 uses the commanded voltage value Vdc*, the low-pass filter output value Iq*$_{td}$ of the commanded current value Iq*, the estimated speed value $\omega_1 c$, the commanded speed value $\omega_r^*$, and the settings (Lq* and Ke*) of the motor constants to estimate the axis error Δθ (=θc*−θ), which is a difference between the estimated phase value θc* and the motor phase value θ, by a calculation according to equation (3).

[Equation 3]

$$\Delta\theta c = \left[ \frac{Vdc^* + \omega_1 c \cdot Lq^* \cdot Iq_{td}^*}{\omega_r^* \cdot Ke^*} \right] \quad (3)$$

The speed estimating part 6 controls the estimated speed value $\omega_1 c$ by a calculation according to equation (4) so that the estimated value Δθc for the axis error becomes 0.

[Equation 4]

$$w\omega_1 c = -\Delta\theta c \cdot \left[ Kp + \frac{Ki}{S} \right] \quad (4)$$

Kp: Proportional gain
Ki: Integration gain
The proportional gain Kp and integration gain Ki are set as in equation (4).

[Equation 5]

$$\begin{bmatrix} Kp = \omega_{PLL} \\ Ki = \frac{\omega_{PLL}^2}{N} \end{bmatrix} \quad (5)$$

Where
N: Break point ratio (times) between the proportional gain and integration gain in the speed estimating part 6
$\omega_{PLL}$: Control response angular frequency in the speed estimating part 6 [rad/s]

The phase estimating part 7 uses the estimated speed value $\omega_1 c$ in a calculation according to equation (6) to control the estimated phase value θC*.

[Equation 6]

$$\theta c^* = \omega_1 c \cdot \frac{1}{S} \quad (6)$$

This completes the explanation of the basic operations in the voltage control and phase control.

Next, operation characteristic when equation (1) is used in the conventional axis error estimation method will be described before the axis error estimating part 5, by which the present invention is characterized, is described.

Figure 2:
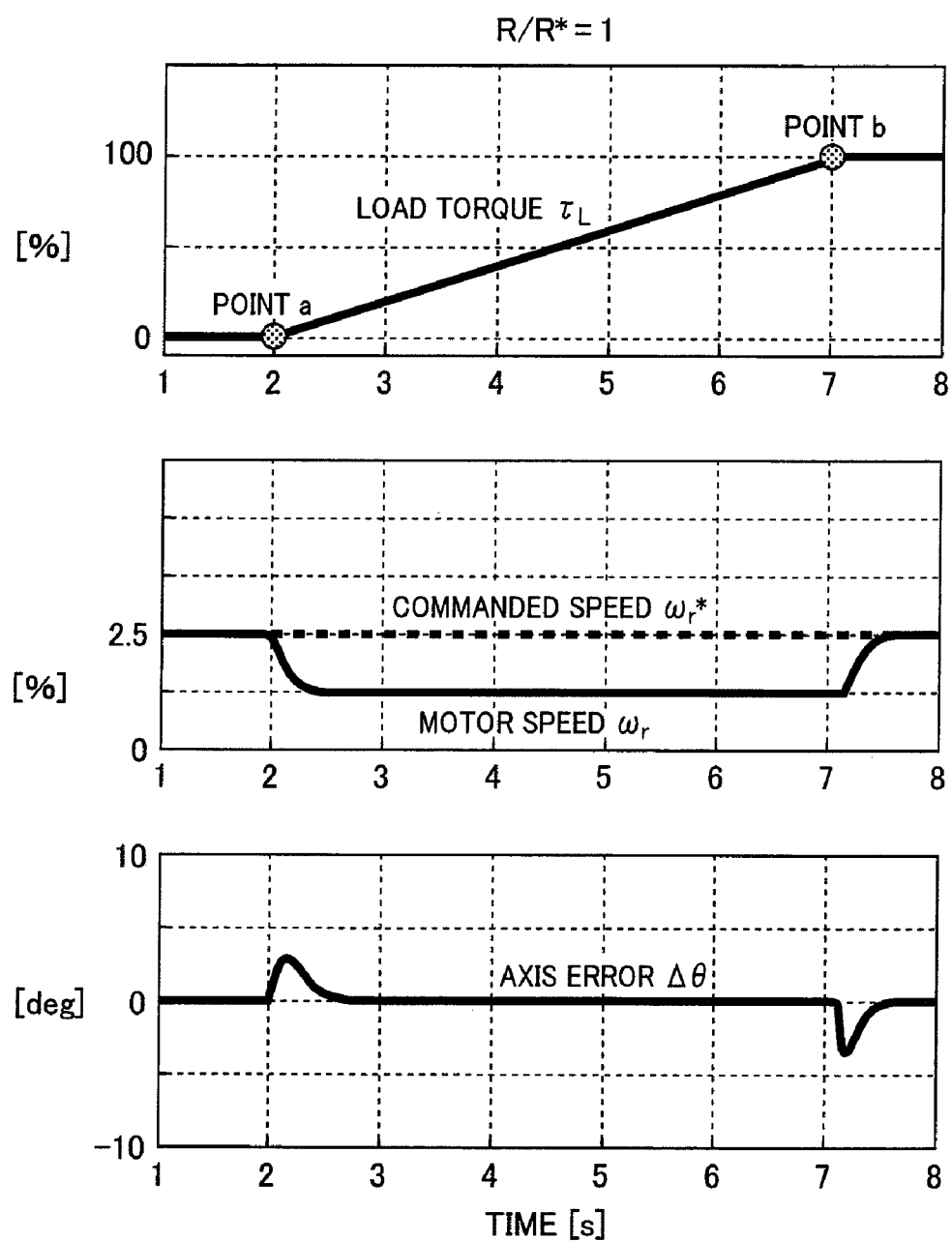
FIG. 2 illustrates operation characteristics when, in a conventional axis error estimation calculation, there is no setting difference (R/R*=1) between an actual resistance value R and a setting R* in a control system.

FIG. 2 illustrates operation characteristics when there is a match between R* set in equation (1) and the actual resistance value R.

The command speed value $\omega_r^*$ is set to a low rotational speed (2.5% of a rated speed), and a load torque $\tau_L$ is applied in a ramp pattern between point a (zero) in the drawing and point b (100% load).

While the load torque $\tau_L$ is applied (within the range from point a to point b), the motor speed $\omega_r$ is reduced by a prescribed value. However, when point b is exceeded, the motor speed follows the commanded speed value $\omega_r$, achieving stable operation.

It is found from the drawing that axis error is generated near points a and b by an absolute value of 3 to 4 degrees.

Figure 3:
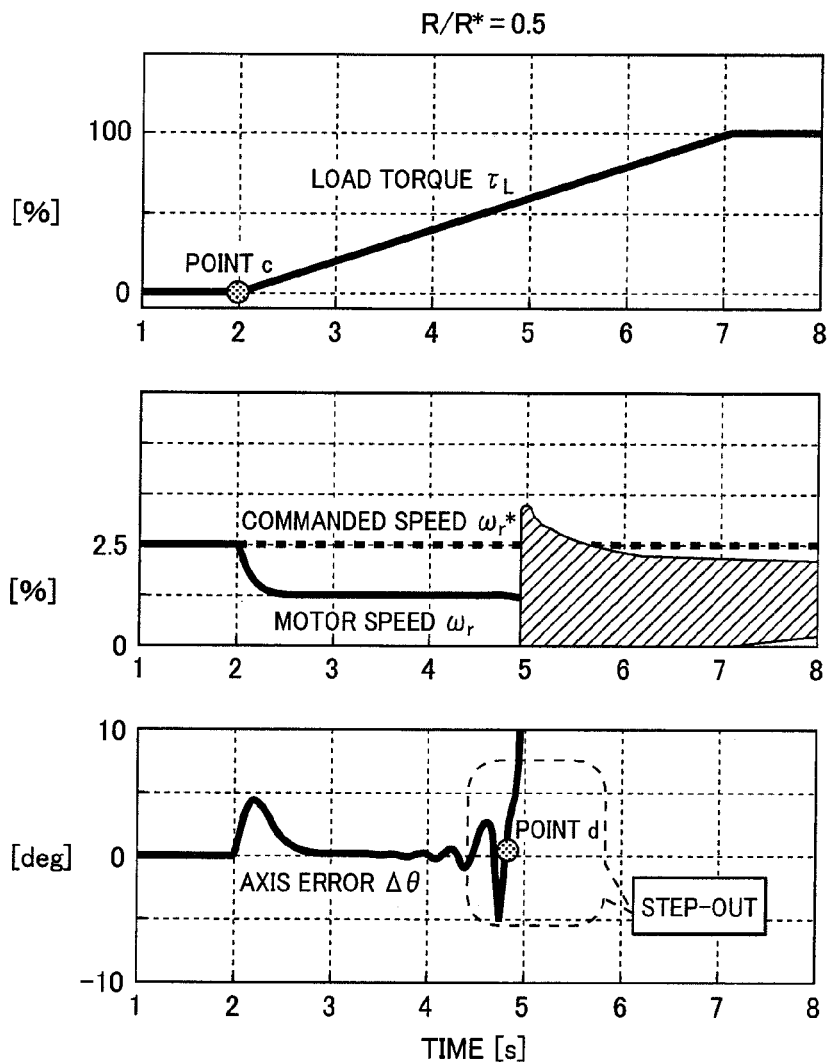
FIG. 3 illustrates operation characteristics when, in the conventional axis error estimation calculation, there is a setting difference (R/R*=0.5) between the actual resistance value R and the setting R*.

FIG. 3 illustrates operation characteristics when there is a difference (R/R*=0.5) between R* set in equation (1) and the actual resistance value R.

Axis error $\Delta\theta$ generated near point c in the drawing is about 5 degrees, which is about twofold of the axis error in FIG. 2. The axis error $\Delta\theta$ starts to vibrate when the load torque is increased to about 40%, and a step-out phenomenon occurs at point d.

That is, when there is a difference between R* set in the speed estimating part 6 and the actual resistance value R, a step-out phenomenon may occur.

Next, the reason why the step-out phenomenon occurs will be described.

When the commanded voltage values (Vd and Vq) in equation (2) are substituted into equation (1), which is the conventional equation for estimating axis error, equation (7) is obtained.

[Equation 7]

$$\Delta\theta c = \tan^{-1}\left[\frac{R^* \cdot (Id^{**} - Idc) - \omega_1 c \cdot Lq^*(Iq^{**} - Iqc)}{R^* \cdot (Iq^{**} - Iqc) + \omega_1 c \cdot Ke^*}\right] \quad (7)$$

When the motor constants (R, Ld, Lq, and Ke) and the control settings (R*, Ld*, Lq*, and Ke*) set in the vector controlling part 12 and axis error estimating part 5 are used to represent the output value Iq of the q-axis current controlling part 10 and the output value Id of the d-axis current controlling part 11, equation (8) is obtained.

[Equation 8]

$$\begin{bmatrix} Id^{} \\ Iq^{} \end{bmatrix} = \begin{bmatrix} \dfrac{\omega_1 c \cdot [Iqc \cdot (Lq^* \cdot R - Lq \cdot R^*) + Lq^* \cdot \omega_1 c \cdot (Ke \cdot \cos\Delta\theta - Ke^*) + Ke \cdot R^* \cdot \sin\Delta\theta]}{R^{*2} + \omega_1 c^2 \cdot Ld^* \cdot Lq^*} \\ \dfrac{Iqc \cdot R \cdot R^* + R^* \cdot \omega_1 \cdot (Ke \cdot \cos\Delta\theta - Ke^*) + Ld^* \cdot \omega_1^2 (Lq \cdot Iqc - Ke \cdot \sin\Delta\theta)}{R^{*2} + \omega_1 c^2 \cdot Ld^* \cdot Lq^*} \end{bmatrix} \quad (8)$$

When equation (8) is substituted into equation (7), equation (9) is obtained.

[Equation 9]

$$\Delta\theta c = \tan^{-1}\left[\frac{-\omega_1 c \cdot (Lq - Lq^*) \cdot Iqc + \omega_1 c \cdot Ke \cdot \sin\Delta\theta}{(R - R^*) \cdot Iqc + \omega_1 c \cdot Ke \cdot \cos\Delta\theta}\right] \quad (9)$$

Suppose that the value of $\Delta\theta$ in equation (9) is small. Then, $\cos\Delta\theta$ can be approximated to 1, and $\sin\Delta\theta$ can be approximated to $\Delta\theta$.

When the d-axis commanded current value Id* is set to 0 for current control and the q-axis inductance value Lq is known (Lq*=Lq), equation (10) is obtained.

[Equation 10]

$$\Delta\theta c \approx \left[\frac{\omega_1 c \cdot Ke \cdot \Delta\theta}{(R - R^*) \cdot Iqc + \omega_1 c \cdot Ke}\right] \quad (10)$$

When the resistance value R in the denominator in equation (10) is noticed, it becomes clear that when R is equal to R*, $\Delta\theta c$ is equal to $\Delta\theta$, but when R is not equal to R*, the estimated value $\Delta\theta c$ includes a setting error component [(R−R*)·Iqc] of the resistance.

When the motor speed $\omega_r$ is a prescribed value, the axis error $\Delta\theta$ is always 0. When, however, the value of $\omega_r$ changes or another transition occurs, $\Delta\theta$ is generated.

When the q-axis detected current value Iqc is positive, if $\Delta\theta$ is generated, the estimated value $\Delta\theta c$ is calculated as follows:

When R>R*

The value of the denominator in equation (10) becomes large, and the estimated value $\Delta\theta c$ is calculated to a value smaller than $\Delta\theta$.

That is, even when the axis error $\Delta\theta$ is generated, the control system recognizes that $\Delta\theta c$ is small (the change in the $\Delta\theta c^*$ is small and the error from $\theta$ becomes large), and a step-out phenomenon is likely to occur.

When R<R*

The value of the denominator in equation (10) becomes small, and the estimated value $\Delta\theta c$ is calculated to a value greater than $\Delta\theta$.

The setting error component [(R−R*)·Iqc] of the resistance becomes negative, and thus the induced voltage component [$\omega_1 c^*Ke$] is cancelled, reducing the value of the denominator. When the value of the denominator reaches 0, a step-out phenomenon occurs.

In summary, the conventional axis error estimation method is problematic in that if there is a setting error (R−R*) in the resistance, in a low-speed rotation range, a step-out phenomenon is likely to occur.

Now, features of the present invention will be described.

Figure 4:
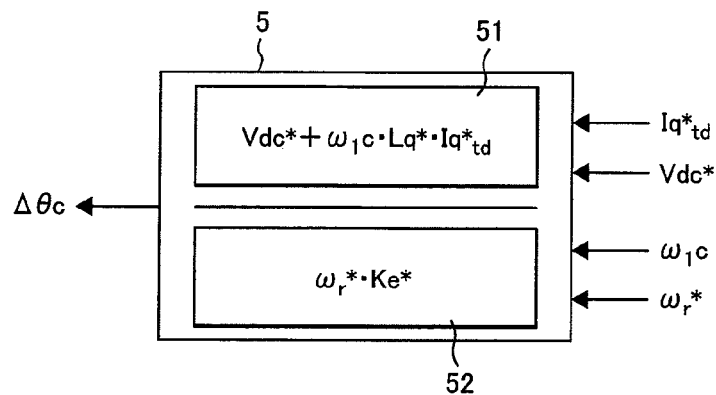
FIG. 4 shows a structure for axis error estimation calculation by which the present invention is characterized.

The structure of the axis error estimating part 5 will be described with reference to FIG. 4.

The numerator calculating part 51 in the axis error estimating part 5 adds the d-axis commanded voltage value Vdc* to the product of three signals, which are the estimated frequency value $\omega_1 c$, the low-pass filter output value of the q-axis commanded current value, and the setting Lq* of the q-axis inductance value Lq, which is a motor constant.

The denominator calculating part 52 multiplies the commanded speed value $\omega_r^*$ by the induced voltage setting Ke*, which is a motor constant.

The calculated numerator is divided by the calculated denominator to output the estimated axis error $\Delta\theta c$. If the axis error $\Delta\theta$ is large, $\Delta\theta$ can be estimated with high precision by the arctangent calculation indicated by equation (11), instead of performing the division operation.

[Equation 11]

$$\Delta\theta_c = \tan^{-1}\left[\frac{Vdc^* + \omega_1 c \cdot Lq^* \cdot Iq_{td}^*}{\omega_r^* \cdot Ke^*}\right] \quad (11)$$

Noticing the value of the denominator in equation (10), the product of the $\omega_r^*$ and Ke* is used in the calculation of the denominator to reduce sensitivity to the setting error (R−R*) of the resistance.

That is, the axis error estimating part 5 uses equation (3) or (11) described above to calculate the estimated value $\Delta\theta c$.

The effect of using equation (3), which is a feature of the present invention, to estimate the axis error will be described.

Figure 5:
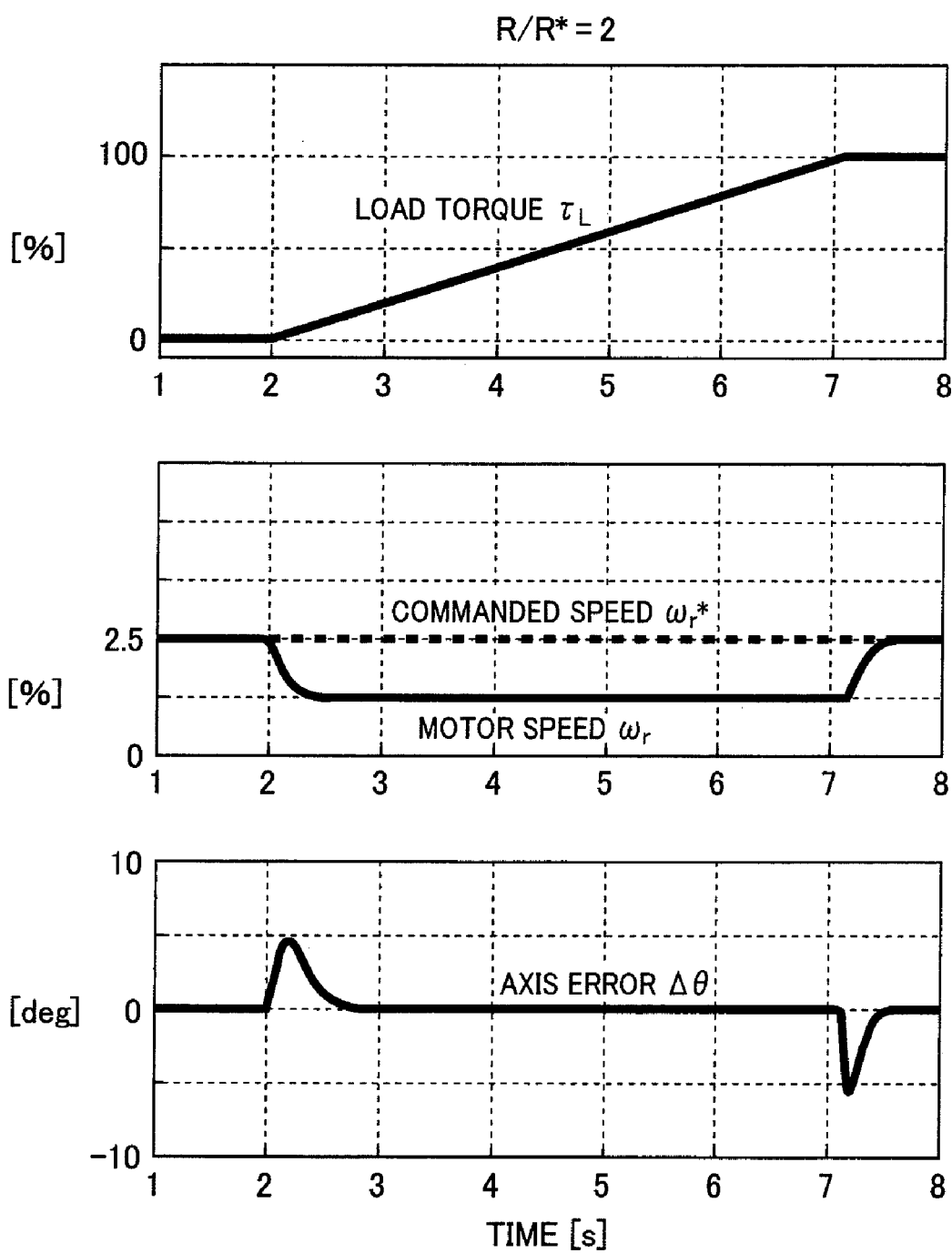
FIG. 5 illustrates operation characteristics when, in an axis error estimation calculation in the present invention, there is a setting difference (R/R*=2) between the actual resistance value R and the setting R* in the control system.
Figure 6:
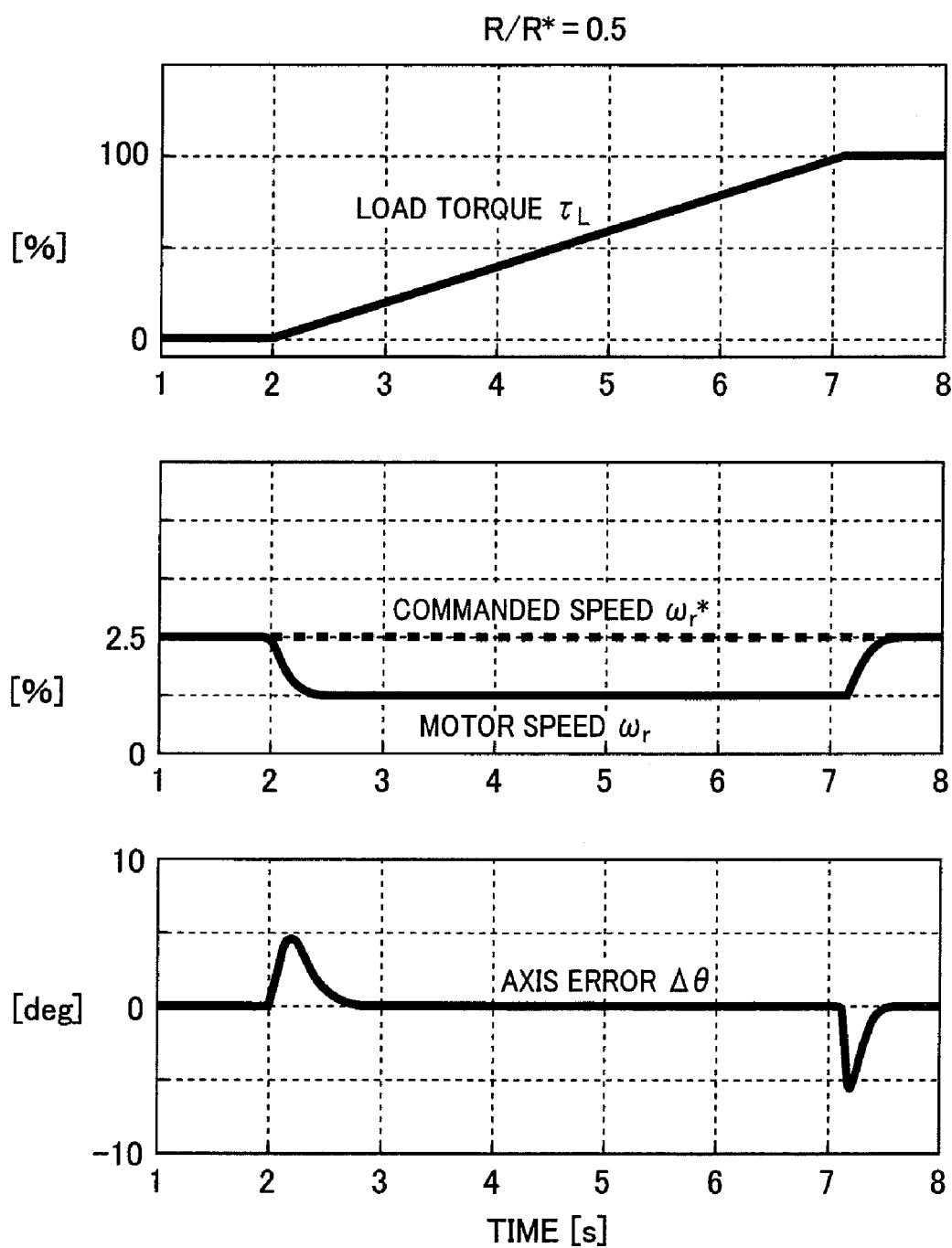
FIG. 6 also illustrates operation characteristics when, in the axis error estimation calculation in the present invention, there is a setting difference (R/R*=0.5) between the actual resistance value R and the setting R* in the control system.

FIG. 5 illustrates characteristics when R is greater than R*(R/R*=2), and FIG. 6 illustrates characteristics when R is smaller than R*(R/R*=0.5).

In both FIGS. 5 and 6, sensitivity to the setting error (R−R*) of the resistance is reduced; these drawings indicate that even when R is not equal to R*, operation is stable.

The axis error $\Delta\theta$ in FIGS. 5 and 6 is an absolute value of about 5 degrees.

It is found that even when (R−R*) is not 0, the value of the axis error $\Delta\theta$ remains unchanged.

A relationship between the motor speed $\omega_r$ and axis error $\Delta\theta$ will be described.

A loop transfer function $G_{\omega\_est}$ (S) from the motor speed $\omega_r$ to the estimated speed value $\omega_1 c$ can be represented by equation (12).

[Equation 12]

$$G_{\omega\_est}(s) = \frac{Kp \cdot S + Ki}{S^2 + Kp \cdot S + Ki} \quad (12)$$

An integrated value of error between the estimated speed value $\omega_1 c$ and the motor speed $\omega_r$ is axis error, so the transfer function $G_{PLL}$ (S) from the motor speed $\omega_r$ to the estimated axis error $\Delta\theta c$ can be rewritten as equation (13) by using equation (5).

[Equation 13]

$$G_{PLL}(s) = (\omega_1 c - \omega_r) \cdot \frac{1}{s} \quad (13)$$

$$= \omega_r \cdot \left(\frac{Kp \cdot S + Ki}{S^2 + Kp \cdot S + Ki} - 1\right) \cdot \frac{1}{s}$$

$$= \omega_r \cdot \left(\frac{\frac{N}{\omega_{PLL}} \cdot S + 1}{\frac{N}{(\omega_{PLL})^2} \cdot S^2 + \frac{N}{\omega_{PLL}} \cdot S + 1}\right) \cdot \frac{1}{s}$$

N is a break point ratio (times) between the proportional gain and integration gain in the speed estimating part 6; in general, the break point ratio is about 5 times. When 5 is substituted into N in equation (13), equation (14) is yielded.

[Equation 14]

$$G'_{PLL}(s) = \omega_r \cdot \left(\frac{\frac{5}{\omega_{PLL}} \cdot S + 1}{\frac{5}{(\omega_{PLL})^2} \cdot S^2 + \frac{5}{\omega_{PLL}} \cdot S + 1}\right) \cdot \frac{1}{s} \quad (14)$$

Control response in the speed estimation calculation is just within the range from 10 to 1000 rad/s. When the value of the control response is substituted into $\omega_{PLL}$ in equation (14) several times, if there is a substantial match between the axis error $\Delta\theta$ and the obtained waveform, it can be indicated that the calculation method based on equation (3) or (11) is used.

In the first embodiment, the axis error estimating part 5 uses the output signal of the low-pass filter 14, but this is not a limitation. If the control gain in the speed controlling part 8 is low and movement of its output signal Iq* is slow, Iq* may be directly used, instead of Iq*$_{td}$, to calculate $\Delta\theta c$. Alternatively, the detected current value Iq may be used instead of Iq*$_{td}$.

The axis error estimating part 5 in the first embodiment uses the commanded speed value $\omega_r^*$ to calculate the denominator, but this is not also a limitation. If the commanded speed value $\omega_r^*$ changes rapidly, $\omega_r^*$ may be passed through a low-pass filter that provides an effect equivalent to the control gain of the speed controlling part 8, and the resulting signal may be used to calculate $\Delta\theta c$. Then, the estimated speed value $\omega_1 c$ may be used instead of the commanded speed value $\omega_r^*$.

Second Embodiment

In the first embodiment, noticing the value of the denominator in the axis error estimating part 5, the product of the $\omega_r^*$ and Ke* has been used in the calculation of the denominator to reduce sensitivity to the setting error (R−R*) of the resistance. In a second embodiment, however, control is carried out by using only the numerator in the axis error estimation calculation.

Figure 7:
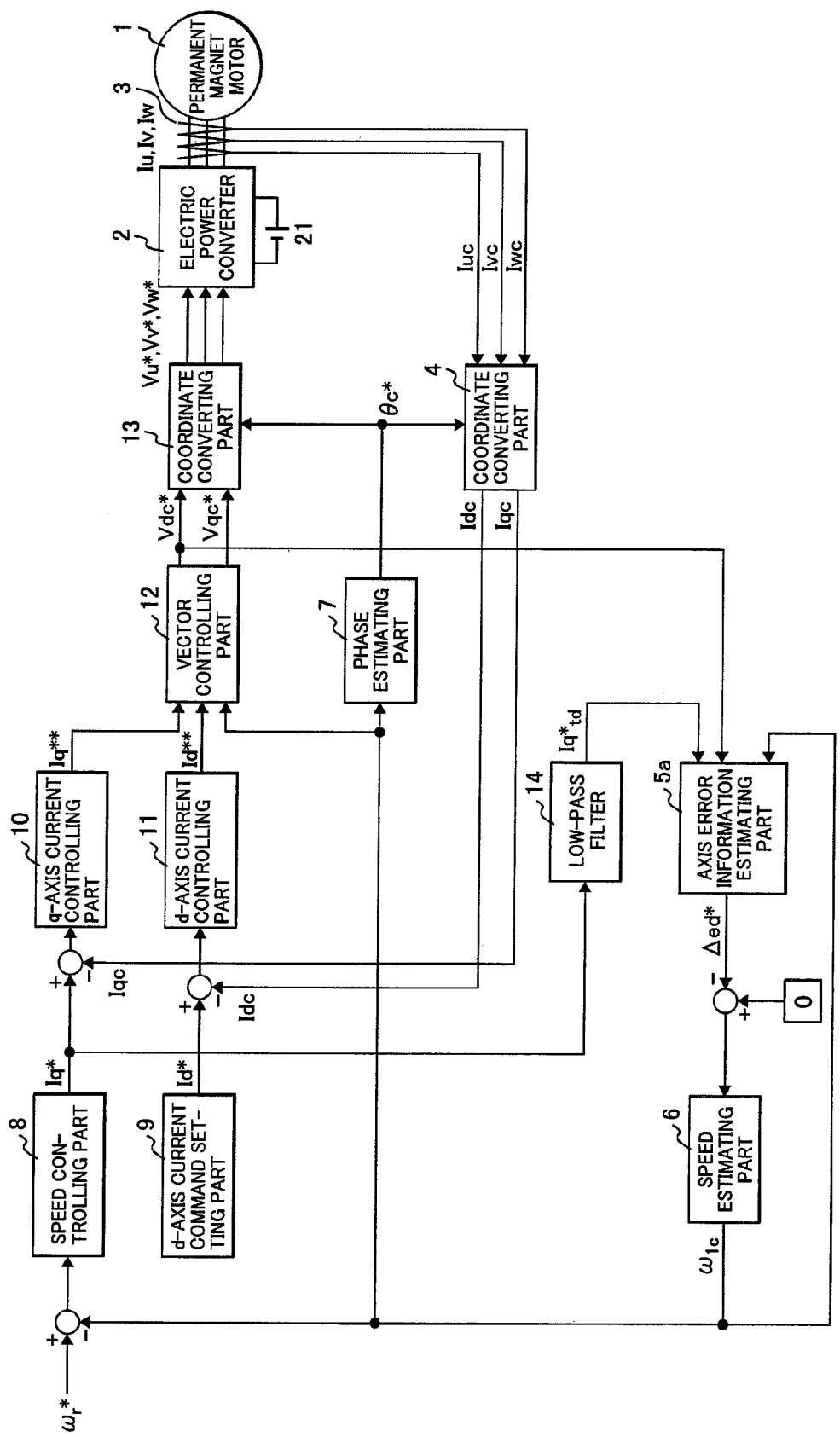
FIG. 7 is a block diagram showing the structure of a position sensorless controller for a permanent magnet motor in another embodiment of the present invention.

FIG. 7 shows the second embodiment. The elements with reference numerals 1 to 4, 6 to 14, and 21 are the same as in FIG. 1. The structure of the axis error information estimating part 5a will be described.

Figure 8:
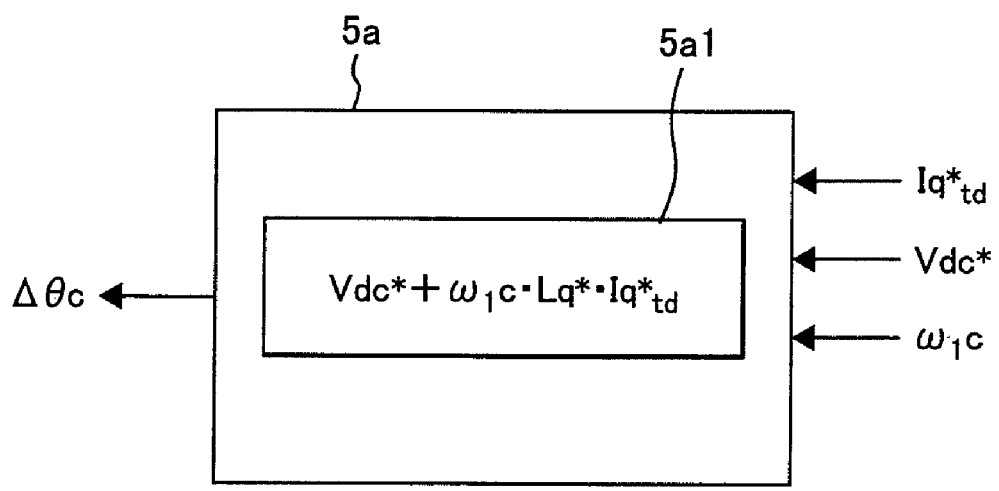
FIG. 8 is a block diagram showing the structure of an axis error information estimating part by which the present invention is characterized.

The axis error information estimating part 5a will be described with reference to FIG. 8.

The axis error information estimating part 5a adds the d-axis commanded voltage value Vdc* to the product of three signals, which are the estimated frequency value $\omega_1 c$, the low-pass filter output value Iq*$_{td}$ of the q-axis commanded current value, and the setting Lq* of the q-axis inductance value Lq, which is a motor constant.

The estimated axis error $\Delta\theta c$ obtained from the above calculation is output. The axis error information estimating part 5a calculates a voltage value $\Delta ed^*$ including the axis error $\Delta\theta$ by using equation (15) and outputs the calculated value.

[Equation 15]

$$\Delta ed^* = Vdc^* + \omega_1 c \cdot Lq^* \cdot Iq^*_{td} \quad (15)$$

In equation (15), cos $\Delta\theta$ is approximated to 1 and sin$\Delta\theta$ is approximated to $\Delta\theta$. When the q-axis inductance Lq is set to a known value (Lq*=Lq), equation (16) is obtained.

[Equation 16]

$$\Delta ed^* \approx \omega_1 c \cdot Ke \cdot \Delta\theta \quad (16)$$

In the second embodiment as well, sensitivity to the setting error (R−R*) of the resistance can be reduced even with a simple structure, and operation can be stabilized even when R is not equal to R*.

In the first and second embodiments, the second commanded current values Id and Iq have been generated from the first commanded current values Id* and Iq* and the detected current values Idc and Iqc, and these commanded current values have been used for vector control calculation. However, this is not a limitation. The first and second embodiments can also be applied to the following methods.

1) Vector control calculation method in which compensated voltage values ΔVd* and ΔVq* are generated from the first commanded current values Id* and Iq* and the detected current values Idc and Iqc, and these compensated voltage values are used together with the first commanded current values Id* and Iq*, the estimated speed value $\omega_1 c$, and the electric constants (R*, Ld*, Lq*, and Ke*) of the permanent magnet motor 1 to calculate the commanded voltage values Vdc* and Vqc*

2) Control calculation method in which the first d-axis commanded current value Id* (=0), a primary delay signal $Iqc_{td}$ of the q-axis detected current value Iqc, the commanded speed value $\omega_r*$, and the electric constants (R*, Ld*, Lq*, and Ke*) of the permanent magnet motor 1 are used to calculate the commanded voltage values Vdc* and Vqc*

In the second embodiment as well, the axis error information estimating part 5a uses the output signal from the low-pass filter 14, but this is not a limitation. If the control gain in the speed controlling part 8 is low and movement of its output signal Iq* is slow, Iq* may be directly used, instead of $Iq*_{td}$, to calculate Δθc. Alternatively, the detected current value Iq may be used instead of $Iq*_{td}$. The estimated speed value $\omega_1 c$ may be used instead of the commanded speed value $\omega_r*$.

In the methods in the first and second embodiments, the current detector 3, which is expensive, has been used to detect the three-phase AC currents Iu, Iv, and Iw. However, the present invention can also be applied to achieve a low-cost system in which a DC current flowing in a one shunt resistor mounted to detect an overcurrent in the electric power converter 2 is used to reproduce the three-phase motor currents Iû, Iv̂, and Iŵ and the reproduced current values are used.

As described above, even if there is a setting error (R–R*) between the resistance value R obtained by adding the winding resistance of the motor to the wire resistances of the inverter (electric power converter) and motor and R* set in the control system (involved in vector calculation and axis error estimation), the present invention can achieve stable operation even in a low-speed rotation range, without causing a step-out phenomenon.

An inexpensive current detecting system can also use the position sensorless controller for a permanent magnet motor in a common manner.

What is claimed is:

1. A position sensorless controller, for a permanent magnet motor, that carries out a vector control calculation for controlling an output frequency and an output voltage of an electric power converter for driving the permanent magnet motor, an axis error estimating calculation for estimating axis error that is a difference between an estimated phase value obtained by integrating an estimate speed value of the permanent magnet motor and a phase value of the permanent magnet motor, and a speed estimation calculation for controlling an-estimated value for the axis error so that the estimated value matches a commanded value for the axis error, wherein, in the axis error estimating calculation, a commanded voltage value for vector control, a detected current value or estimated current value, an inductance value for a motor constant, an induced voltage constant, and an estimated speed value or commanded speed value are used to estimate the information about axis error, wherein, in the axis error information estimating calculation, a d-axis commanded voltage value, which is an output in the vector control calculation, is added to a product of three signals, which are the q-axis detected current value or the commanded current value, the inductance value, and the estimated speed value or the commanded speed value, and then a resulting value is divided by the product of the commanded speed value and the induced voltage constant.

2. A position sensorless controller, for a permanent magnet motor, that carries out a vector control calculation for controlling an output frequency and an output voltage of an electric power converter for driving the permanent magnet motor, an axis error estimating calculation for estimating axis error that is a difference between an estimated phase value obtained by integrating an estimate speed value of the permanent magnet motor and a phase value of the permanent magnet motor, and a speed estimation calculation for controlling an-estimated value for the axis error so that the estimated value matches a commanded value for the axis error, wherein, in the axis error estimating calculation, a commanded voltage value for vector control, a detected current value or estimated current value, an inductance value for a motor constant, an induced voltage constant, and an estimated speed value or commanded speed value are used to estimate the information about axis error, wherein, in the axis error information estimating calculation, a d-axis commanded voltage value, which is an output in the vector control calculation, is added to a product of three signals, which are the q-axis detected current value or the commanded current value, the inductance value, and the estimated speed value or the commanded speed value, and then an arctangent calculation is performed for a resulting value by using the product of the commanded speed value and the induced voltage constant.

* * * * *